US009812870B2

United States Patent
Zhao et al.

(10) Patent No.: US 9,812,870 B2
(45) Date of Patent: Nov. 7, 2017

(54) MICROGRID REACTIVE POWER MANAGEMENT FOR VOLTAGE REGULATION DURING AND SUBSEQUENT TO ISLANDING

(71) Applicant: NEC Laboratories America, Inc., Princeton, NJ (US)

(72) Inventors: Junhui Zhao, Hamden, CT (US); Di Shi, San Jose, CA (US); Ratnesh K. Sharma, Fremont, CA (US)

(73) Assignee: NEC Corporation, Tokyo (JP)

( * ) Notice: Subject to any disclaimer, the term of this patent is extended or adjusted under 35 U.S.C. 154(b) by 675 days.

(21) Appl. No.: 14/463,204

(22) Filed: Aug. 19, 2014

(65) Prior Publication Data

US 2015/0054339 A1 Feb. 26, 2015

Related U.S. Application Data

(60) Provisional application No. 61/868,127, filed on Aug. 21, 2013.

(51) Int. Cl.
*H02J 3/38* (2006.01)
*H02J 3/16* (2006.01)

(52) U.S. Cl.
CPC .............. *H02J 3/386* (2013.01); *H02J 3/16* (2013.01); *H02J 2003/388* (2013.01); *Y02E 10/763* (2013.01); *Y02E 40/34* (2013.01); *Y02P 80/14* (2015.11); *Y02P 80/152* (2015.11); *Y10T 307/352* (2015.04); *Y10T 307/549* (2015.04)

(58) Field of Classification Search
None
See application file for complete search history.

(56) References Cited

U.S. PATENT DOCUMENTS

| 5,646,512 A * | 7/1997 | Beckwith ............... G05F 1/153 323/211 |
| 2012/0280673 A1* | 11/2012 | Watanabe ............. H02J 3/1885 323/304 |

OTHER PUBLICATIONS

Aghatehrani, R., et al. "Reactive Power Management of a DFIGWind System in Microgrids Based on Voltage Sensitivity Analysis" IEEE Transcations on Sustainable Energy, vol. 2, No. 4, Oct. 2011. pp. 451-458.

Katiraei, F., et al. "Micro-Grid Autonomous Operations During and Subsequent to Islanding Process" IEEE Transactions on Power Delivery, vol. 20, No. 1, Jan. 2005. pp. 248-257.

Lopes, J., et al. "Defining Control Strategies for MicroGrids Islanded Operation" IEEE Transactions on Power Systems, vol. 21, No. 2, May 2006. pp. 916-924.

Sao, C., et al. "Control and Power Management of Converter Fed Microgrids" IEEE Transactions on Power Systems, vol. 23, No. 3, Aug. 2008. pp. 1088-1098.

\* cited by examiner

*Primary Examiner* — Stephen W Jackson
*Assistant Examiner* — David M Stables
(74) *Attorney, Agent, or Firm* — Joseph Kolodka

(57) ABSTRACT

Methods and systems for power management include determining a voltage level of a grid; if the voltage level is below a lower voltage threshold, setting power outputs for one or more distributed generators on the grid to maximum; and if the voltage level is above the lower voltage threshold and below an upper voltage threshold, determining power outputs for one or more distributed generators on the grid using sensitivity-based distributed Q compensation.

18 Claims, 4 Drawing Sheets

FIG. 1

MICROGRID REACTIVE POWER MANAGEMENT FOR VOLTAGE REGULATION DURING AND SUBSEQUENT TO ISLANDING

RELATED APPLICATION INFORMATION

This application claims priority to provisional application No. 61/868,127 filed Aug. 21, 2013, the contents thereof are incorporated herein by reference.

BACKGROUND OF THE INVENTION

A microgrid (MG) is a small-scale power network that operates in grid-tied mode under normal operating condition and switches to islanded mode when grid disturbance occurs. The transition from the grid-tied mode to the stand-alone mode is known as the islanding process. For fault-induced islanding, voltage in the MG can drop to as low as 0.2 per-unit (p.u.), and it usually takes more than 30 cycles for the voltage to recover to its nominal value. This voltage recovery process may take much longer if the MG is heavily penetrated with dynamic load, such as single-phase induction motors (SPIMs). These motors stall under low voltage condition (e.g., less than about 0.87 p.u.), after which they absorb two to three times the rated power, making power generation in the MG insufficient. Some predictions put the eventual penetration of SPIMs in a distribution system as high as 75% due to government incentives and energy efficiency requirements. It is dangerous to keep voltage in an MG low for a long period, since load will be shed by under-voltage load shedding protection schemes. Using reactive power generated from distributed energy resources (DERs) is a possible solution for MG voltage regulation.

Two existing methods for sharing reactive power among electronic-interfaced distributed generators (EIDGs) have been proposed. A first is to use droop control to solve the reactive power sharing problem among distributed generators (DGs). By drooping voltage references of DG controllers against the real or reactive power outputs, parallel operation of DGs is enabled. However, droop control is based on local voltage measurements only and is incapable of regulating the voltage at buses that have no DG nearby.

Another method is to use a method based on voltage sensitivity to regulate the voltage of a specific bus. By adjusting the reactive power output of a DG, e.g., a wind generator, based on its active power generation, voltage at the targeted bus is constrained to a certain limit. This method may work well when the MG is operating at steady state with only one DG, but it does not take into account the MG under transients or with multiple DGs.

As such, existing methods of controlling reactive power generation and properly sharing the burden among EIDGs are inadequate to solve the problem.

BRIEF SUMMARY OF THE INVENTION

A method for power management includes determining a voltage level of a grid; if the voltage level is below a lower voltage threshold, setting power outputs for one or more distributed generators on the grid to maximum; and if the voltage level is above the lower voltage threshold and below an upper voltage threshold, determining power outputs for one or more distributed generators on the grid using sensitivity-based distributed Q compensation.

A power management system includes a power module comprising a processor configured to determine a voltage level of a grid, to set power outputs for one or more distributed generators on the grid to maximum if the voltage level is below a lower voltage threshold, and to set power outputs for the one or more distributed generators on the grid using sensitivity-based distributed Q compensation if the voltage level is above the lower voltage threshold and below an upper voltage threshold.

DETAILED DESCRIPTION

Embodiments of the present principles use sensitivity-based reactive power management to remotely regulate the voltage in a microgrid (MG). When islanding occurs, the proposed algorithm helps restore voltages at weak buses that may be heavily penetrated with dynamic loads such as single-phase induction motors (SPIMs). The reactive power compensation of the present embodiments works in two stages according to the status of the system. During the islanding process, when system voltage falls/stays below a pre-defined threshold, electronic-interfaced distributed generators (EIDGs) are dispatched to generate the maximum possible reactive power to help shorten the voltage recovery time. When system voltage reaches a pre-defined threshold, a voltage sensitivity aided linear programming problem is formulated and solved recursively to determine the optimal sharing of reactive power among EIDGs. The present embodiments therefore identify how much reactive power is needed from the EIDGs to regulate voltage and identify how to share reactive power among the EIDGs. The present embodiments lower the cost for voltage regulation in MGs by using existing EIDGs and, furthermore, remote management is convenient and efficient for distribution network operators.

Figure 1:
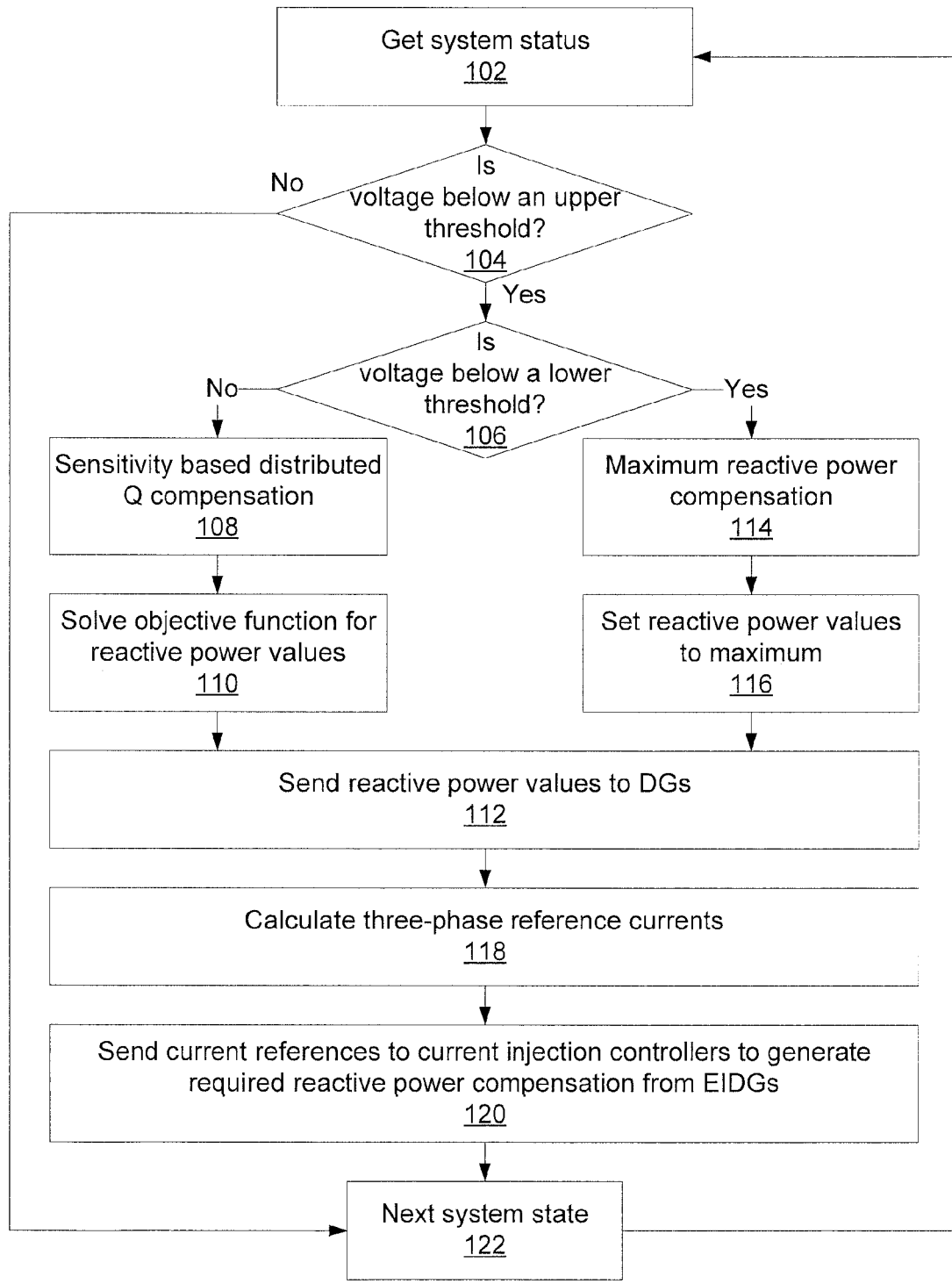
FIG. 1 is a block/flow diagram of a method for power management in accordance with the present principles.

Referring now to FIG. 1, a method for managing reactive power generation is shown. Block 102 obtains a system status of the MG, including a current voltage level. Block 104 determines whether the voltage is below an upper voltage threshold, indicating that some degree of management is needed. Block 106 then determines whether the voltage is below a lower voltage threshold, which determines which kind of management to engage. If the voltage is below the lower voltage threshold, block 108 begins sensitivity-based distributed Q compensation (SBDQC), and if the voltage is above the lower voltage threshold, block 114 begins maximum reactive power compensation.

In sensitivity-based distributed Q compensation, block 110 solves an objective function to determine reactive power values. This process includes minimizing the objective function $Q'_{1,ref} + Q'_{2,ref} + \ldots + Q'_{l,ref}$, where $Q'_{n,ref}$ is the reactive power reference for the controller of the nth EIDG and l is the number of EIDGs. This function is minimized under the following constraints:

1. The voltage at a bus should stay within its security range, $V^{lower} \leq (V+\Delta V) \leq V^{upper}$, where the buses include weak buses and EIDG buses, V is the voltage of the bus, and $\Delta V$ is the voltage deviation at the bus.

2. The reactive power generated by $EIDG_l$ cannot exceed its maximum capability, $Q'_{l,max}$.

The values $Q'_{n,ref}$ generated by minimizing the objective function are provided to the EIDGs in block 112 to manage their power generation during and after the islanding process.

If the voltage was below the lower voltage threshold in block 106, maximum reactive power compensation is employed. In this case, block 116 sets each of the reactive power values $Q'_{n,ref}$ to their maximum values and said values are provided to the EIDGs in block 112. This voltage state represents circumstances in which the entire output of the EIDGs is employed, due to the particularly low voltage level.

After the reactive power values are sent to the EIDGs, three-phase reference currents for the generator are calculated in block 118. These reference currents are used by current injection controllers, described in more detail below, to generate the needed active power compensation by the EIDGs in block 120. After managing the power generation, block 122 waits for the next system state. This system state may be updated periodically or may be triggered by changing voltage conditions.

Blocks 108 and 110 make use of voltage sensitivity factors to formulate the linear programming problem. A voltage sensitivity matrix relates the changes in magnitudes and angles of bus voltages to the changes in real and reactive power injections at the buses. The voltage sensitivity matrix can be calculated by inverting a Jacobian matrix at a specific operating point. The power flow equations involved are:

$$\begin{cases} P_i = \sum_{k=1}^{n} |V_i||V_k|(G_{ik}\cos(\theta_i - \theta_k) + B_{ik}\sin(\theta_i - \theta_k)) \\ Q_i = \sum_{k=1}^{n} |V_i||V_k|(G_{ik}\sin(\theta_i - \theta_k) - B_{ik}\cos(\theta_i - \theta_k)) \end{cases}$$

where $P_i$ and $Q_i$ are the real and reactive power injections at bus i, $Y_{ik}=G_{ik}+jB_{ik}$ is the inverse of the impedance of a line connecting buses i and k, and $V_i \angle \theta_i$ and $V_k \angle \theta_k$ are the voltage phasors at bus i and bus k respectively. The Jacobian matrix is obtained by linearizing the power flow equations as:

$$\begin{bmatrix} \Delta P \\ \Delta Q \end{bmatrix} = \begin{bmatrix} \frac{\partial P}{\partial \theta} & \frac{\partial P}{\partial V} \\ \frac{\partial Q}{\partial \theta} & \frac{\partial Q}{\partial V} \end{bmatrix} \begin{bmatrix} \Delta \theta \\ \Delta V \end{bmatrix}$$

By inverting the well-conditioned Jacobian matrix, the voltage sensitivity matrix is derived as:

$$\begin{bmatrix} \Delta \theta \\ \Delta V \end{bmatrix} = \begin{bmatrix} A & B \\ C & D \end{bmatrix} \begin{bmatrix} \Delta P \\ \Delta Q \end{bmatrix},$$

where $$A = \frac{\partial P^{-1}}{\partial \theta} + \frac{\partial P^{-1}}{\partial \theta} \frac{\partial P}{\partial V} \left( \frac{\partial Q}{\partial V} - \frac{\partial Q}{\partial P} \frac{\partial P^{-1}}{\partial \theta} \frac{\partial P}{\partial V} \right)^{-1} \frac{\partial Q}{\partial \theta} \frac{\partial P^{-1}}{\partial \theta},$$

-continued $$B = -\frac{\partial P^{-1}}{\partial \theta} \frac{\partial P}{\partial V} \left( \frac{\partial Q}{\partial V} - \frac{\partial Q}{\partial \theta} \frac{\partial P^{-1}}{\partial \theta} \frac{\partial P}{\partial V} \right)^{-1},$$

$$C = -\left( \frac{\partial Q}{\partial V} - \frac{\partial Q}{\partial \theta} \frac{\partial P^{-1}}{\partial \theta} \frac{\partial P}{\partial V} \right)^{-1} \frac{\partial Q}{\partial \theta} \frac{\partial P^{-1}}{\partial \theta},$$

and $$D = \left( \frac{\partial Q}{\partial V} - \frac{\partial Q}{\partial \theta} \frac{\partial P^{-1}}{\partial \theta} \frac{\partial P}{\partial V} \right)^{-1}.$$

The voltage of the target bus to be regulated is denoted as $V_j$ and the real and reactive power of the buses with EIDGs is denoted as $P_i$ and $Q_i$ respectively. $D_{ij}$ is the sensitivity factor denoting the deviation of voltage at bus j caused by the deviation of reactive power of $EIDG_i$. Assuming the real power injections at buses remain constant during the entire islanding process, the voltage deviations at the target bus can be calculated as:

$$\Delta V_j = \sum_l D_{lj} \Delta Q_l$$

The voltage deviation at a bus j is determined not only by EIDGs at the same bus (i.e., where j=l), but also by EIDGs from other buses. Therefore, for a weak (heavily loaded) bus with no EIDG, it is possible to regulate its voltage by adjusting reactive power outputs of remote DGs. Hence, the linear programming problem is formulated to calculate the amount of reactive power to generate at DGs to regulate voltage at weak buses. Voltage regulation by distributed EIDGs involves the assistance of phasor measurement units and a communication system. To minimize cost, only weak buses are equipped with phasor measurement units.

As noted above, block 110 uses these voltage deviation values to solve the linear programming problem, $f= \min(Q'_{1,ref}+Q'_{2,ref}+ \ldots +Q'_{l,ref})$. The minimization is performed subject to $V_j^{lower} \leq (V_j+\Delta V_j) \leq V_j^{upper}$, where $\Delta V_j$ is the voltage deviation at bus j as described above, and $0<Q'_{l,ref}=(Q_{l,ref}+\Delta Q_l) \leq Q_{l,max}$, which states that the reactive power generated by $EIDG_l$ cannot exceed its maximum capacity, $Q_{l,max}$.

Figure 2:
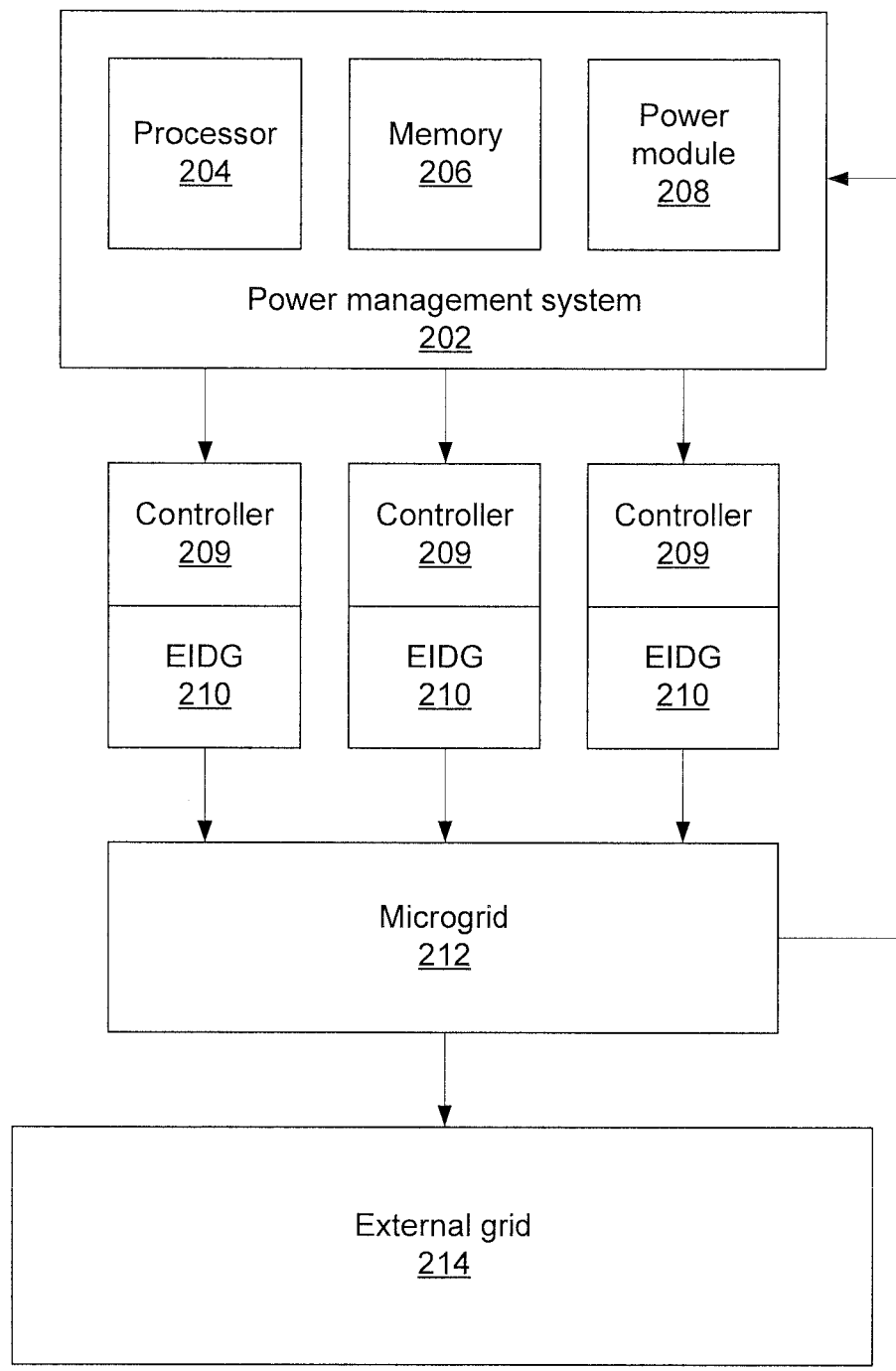
FIG. 2 is a block diagram of a power management system for a microgrid that includes distributed generators in accordance with the present principles.

Referring now to FIG. 2, a system for managing reactive power generation is shown. The power management system 202 includes a processor 204 and a memory 206 that implement a power module 208. The power module makes decisions on how the power management system controls the EIDGs 210 which, in turn, provide generated power to the MG 212. Each EIDG 210 is controlled by a current injection controller 209 that receives the instructions from the power management system 202. The power management system 202 makes these decisions regarding power generation based on information from the MG 212.

The MG 212 is connected to a larger external grid 214, which can be used to supply and absorb power during fluctuations in local power generation. In case the connection to the external grid 214 is disrupted, however, the MG 212 is "islanded," and EIDGs 210 are used to supply power. The power management system 202 controls the EIDGs 210 as described above to supply power to the MG 212 under low-voltage conditions.

Figure 3:
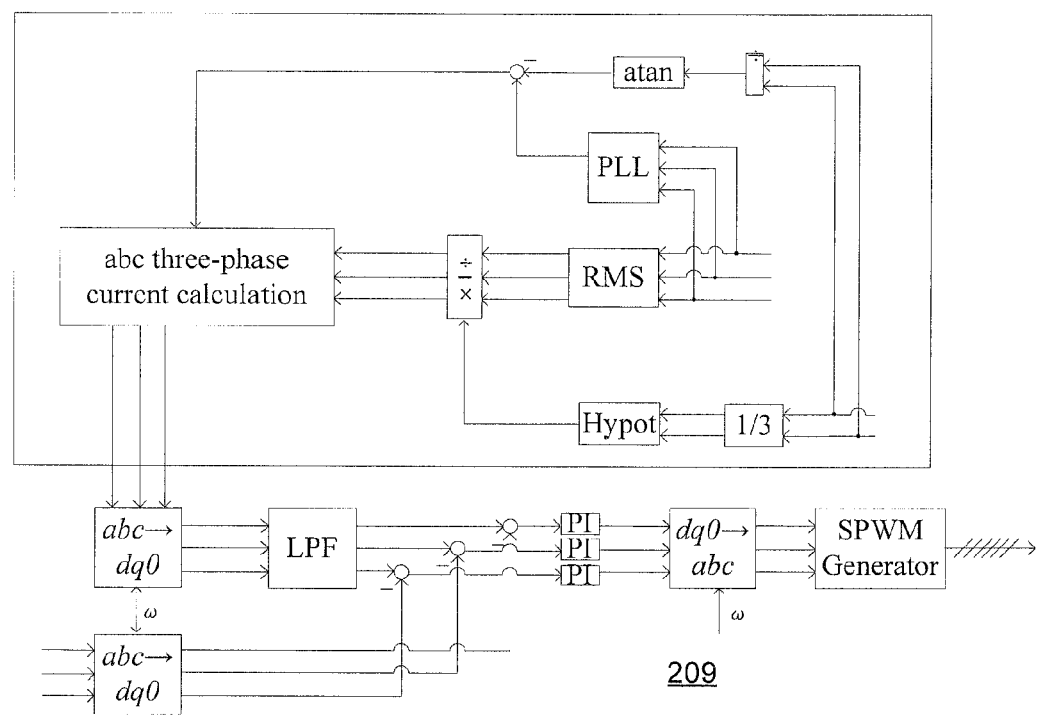
FIG. 3 is a block diagram of a current injection circuit for controlling distributed generators in accordance with the present principles.

Referring now to FIG. 3, a diagram of a current injection controller 209 is shown. Prior techniques for controlling EIDGs in a distributed network are always set out in the context of a three-phase balanced network. However, controlling EIDGs in an unbalanced network is a more realistic scenario, because of the unbalanced usage in the distributed network. The current injection controller described below therefore controls EIDGs in unbalanced configurations.

Because of possible voltage imbalances in the low voltage distribution network, the three-phase injected real (P) and reactive (Q) powers should be controlled separately based on their voltage magnitudes. In addition, after the transformation of three-phase currents from abc to dq0 coordinates, it may not correctly reflect the dynamics of the system by overlooking the zero sequence current, $I_0$. In an unbalanced power grid, the zero sequence current also influences the dynamic performance of the controller and should be managed as well.

The injection current calculation block 302 calculates the three-phase current reference based on measured three-phase voltage phasors at an inverter according to the following:

$$\begin{cases} I_{a,ref} = \sqrt{2}\, I_{a,rms} \sin(\theta) \\ I_{b,ref} = \sqrt{2}\, I_{b,rms} \sin(\theta - 2\pi/3) \\ I_{c,ref} = \sqrt{2}\, I_{c,rms} \sin(\theta + 2\pi/3) \end{cases}$$

$$\begin{cases} I_{a,rms} = \dfrac{\sqrt{P_{ref}^2 + Q_{ref}^2}}{3} \div V_{a,rms} \\ I_{b,rms} = \dfrac{\sqrt{P_{ref}^2 + Q_{ref}^2}}{3} \div V_{b,rms} \\ I_{c,rms} = \dfrac{\sqrt{P_{ref}^2 + Q_{ref}^2}}{3} \div V_{c,rms} \end{cases}$$

and $$\theta = \omega t - \operatorname{atan}\dfrac{Q_{ref}}{P_{ref}},$$

where $I_{n,ref}$ are the reference currents in abc coordinates, $I_{n,rms}$ are the root mean squared currents in abc coordinates, $P_{ref}$ is the real power reference, $Q_{ref}$ is the reactive power reference, $\theta$ is the phase angle, and $\omega t$ is the phase of the measured three-phase voltage.

Both the three-phase reference and the measured currents are transformed from the abc frame into the dq0 frame using a Clarke transformation. The difference between the reference and the measured currents is fed into PI current controllers. These control signals are used to modulate the pulse generator to produce pulses for the inverter switches, which control the inverter output currents. The abc/dq0 transformation is obtained as:

$$\begin{bmatrix} u_d \\ u_q \\ u_0 \end{bmatrix} = \dfrac{2}{3} \begin{bmatrix} \cos(\omega) & \cos\left(\omega - \dfrac{2\pi}{3}\right) & \cos\left(\omega + \dfrac{2\pi}{3}\right) \\ -\sin(\omega) & -\sin\left(\omega - \dfrac{2\pi}{3}\right) & -\sin\left(\omega + \dfrac{2\pi}{3}\right) \\ \dfrac{1}{2} & \dfrac{1}{2} & \dfrac{1}{2} \end{bmatrix} \begin{bmatrix} u_a \\ u_b \\ u_c \end{bmatrix}$$

where $u_n$ are coordinate values in the abc and dq0 coordinate systems. The inverse transformation is given by:

$$\begin{bmatrix} u_a \\ u_b \\ u_c \end{bmatrix} = \begin{bmatrix} \cos(\omega) & -\sin(\omega) & 1 \\ \cos\left(\omega - \dfrac{2\pi}{3}\right) & -\sin\left(\omega - \dfrac{2\pi}{3}\right) & 1 \\ \cos\left(\omega + \dfrac{2\pi}{3}\right) & -\sin\left(\omega + \dfrac{2\pi}{3}\right) & 1 \end{bmatrix} \begin{bmatrix} u_d \\ u_q \\ u_0 \end{bmatrix}$$

Transient voltages during islanding cause the transience of the calculated dq0 reference current. If the transient values are large, they may destabilize the system. To smooth the transient process, a low pass filter is used. The filter only alleviates the high frequency transients and does not change the steady-state values of the dq0 reference current.

After a fault-induced islanding, the MG is first stabilized. It is dangerous to keep the voltage in the MG low for a long period, as the MG will shed load. A master/slave control strategy is used, where one EIDG 210 is controlled as the "master" to provide a reference for the voltage and frequency during islanding. The other EIDGs 210 are controlled as "slaves" to generate P and Q values.

Figure 4:
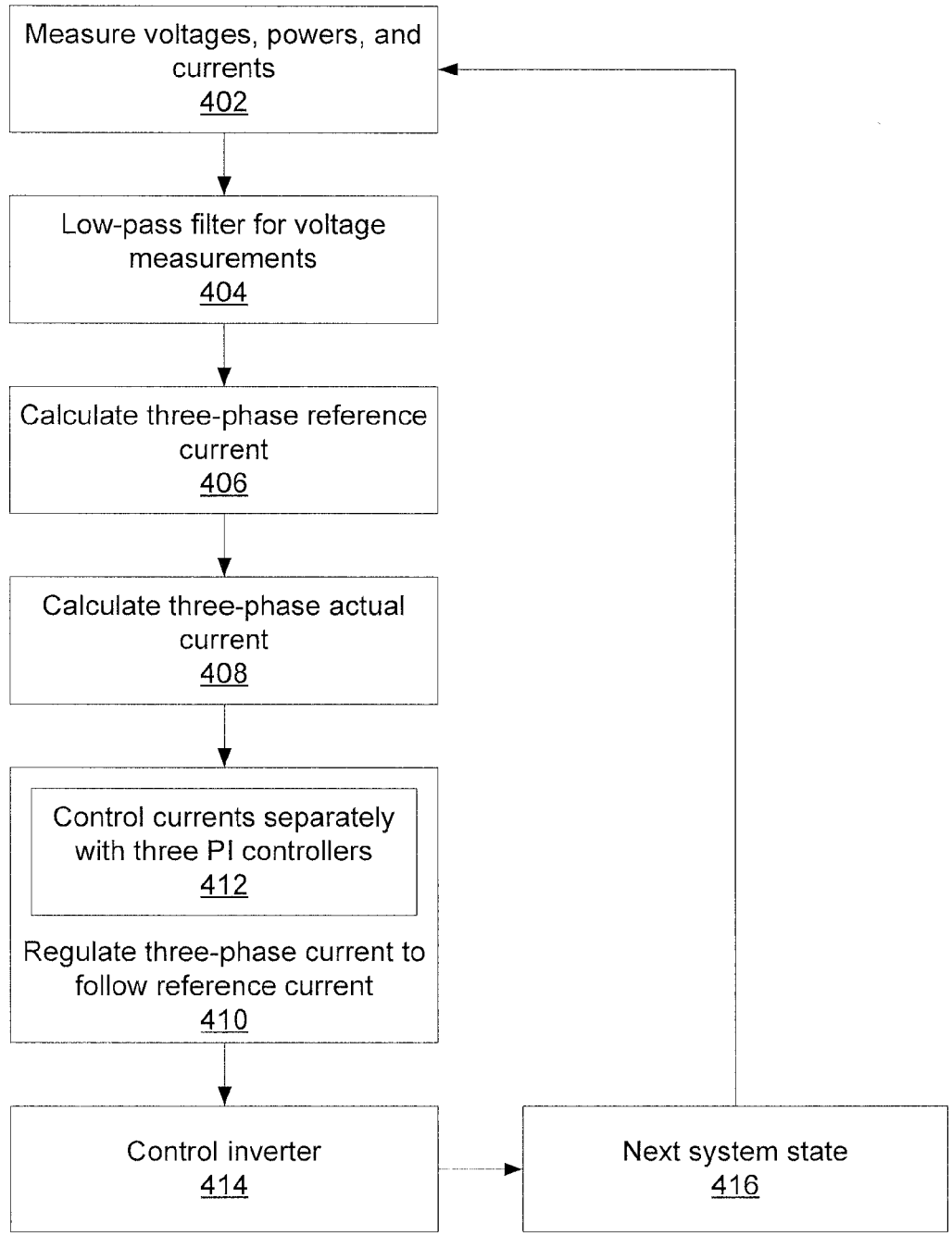
FIG. 4 is a block/flow diagram of a current injection method for controlling distributed generators in accordance with the present principles.

Referring now to FIG. 4, a method of injecting current is shown. Block 402 measures the present voltages and currents at the DGs as well as the real and reactive powers generated by the linear programming problem. Block 404 passes the voltages through a low-pass filter to remove high-frequency transients from the islanding process. Block 406 calculates three-phase reference currents based on the filtered voltages as described above, while block 408 calculates three-phase actual currents from the measured currents. Block 410 regulates the three-phase currents of the DGs to follow the calculated reference currents, with block 412 using three PI controllers to control the three-phase currents separately. Block 414 controls the inverters of the DGs using, e.g., pulse width modulation (PWM) to produce the desired currents. Block 416 then waits for the next system state, which may be triggered periodically or according to some voltage/current condition, before processing returns to block 402.

Using a diesel generation system (DGS) as an example, a governor is used in grid-tied mode to control a servo motor. The governor sends output of a PI controller to the servo motor to get a control signal that includes a gain and time constant of the servo motor. Together with speed change rate, these quantities are sent to a turbine to get the reference of mechanic power of a synchronous generator.

In standalone mode, the governor guarantees the speed of the servo motor follows the reference. When the MG is islanded, the diesel generator switches from P&Q control mode (based on real and reactive power controls) to V&F control mode (based on voltage and frequency) to actively regulate the voltage and frequency of the MG.

Before a fault that triggers islanding, the MG is initially operating at a steady state and the bus voltage is within the security range. After the fault, the voltage drops to a very low value. The MG is islanded from the utility grid and immediately voltage starts rising. During a recovery time interval, bus voltage recovers to the pre-defined voltage threshold, after which the voltage reaches a steady-state value that is nonetheless outside the security range. Thus, if the voltage is below the lower threshold, the maximum power is generated, because the voltage is far from normal steady-state operating conditions and thus sensitivity-based control may be ineffective. After the voltage exceeds that lower threshold, but still does not exceed the security threshold, sensitivity-based Q compensation is employed as described above to compensate the voltage by providing reactive power from the EIDGs 210.

Thus, after islanding, the present embodiments act to stabilize the MG. To accomplish this, a master/slave control strategy is used, where one DG is controlled as the "master" and is used to provide a reference for the voltage and frequency during islanding. The other DGs are controlled as "slaves" to generate the real and reactive power values.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for power management, comprising:
   determining a voltage level of a grid;
   if the voltage level is below a lower voltage threshold, setting power outputs for one or more distributed generators on the grid to maximum; and
   if the voltage level is above the lower voltage threshold and below an upper voltage threshold, determining power outputs for one or more distributed generators on the grid using sensitivity-based distributed reactive power compensation by minimizing a sum of power outputs across the distributed generators, wherein a total voltage generated by the one or more distributed generators maintains the voltage level of the grid between the upper and lower voltage thresholds and is the sum of a target bus voltage and a voltage deviation at the bus determined from a voltage sensitivity matrix, the voltage deviation for a bus j being calculated as:

$$\Delta V_j = \sum_l D_{lj} \Delta Q_l$$

where $D_{lj}$ is an element of the voltage sensitivity matrix defined as $$D = \left( \frac{\partial Q}{\partial V} - \frac{\partial Q}{\partial \theta} \frac{\partial P^{-1}}{\partial \theta} \frac{\partial P}{\partial V} \right)^{-1}$$

and $\Delta Q_l$ is a change in reactive power at the bus.

2. The method of claim 1, wherein sensitivity-based distributed Q compensation comprises minimizing a sum of power outputs across the distributed generators.

3. The method of claim 2, wherein a total voltage generated by the one or more distributed generators maintains the voltage level of the grid between the upper and lower voltage thresholds.

4. The method of claim 3, wherein the total voltage is a sum of a target bus voltage and a voltage deviation at the bus determined from a voltage sensitivity matrix.

5. The method of claim 1, wherein the grid comprises a dynamic load.

6. The method of claim 5, wherein the dynamic load comprises one or more single phase induction motors that have stalled.

7. The method of claim 1, wherein the conditional steps of setting power outputs are performed during an islanding condition in the grid.

8. The method of claim 1, wherein the conditional steps of setting power outputs are performed during a recovery period subsequent to islanding in the grid.

9. The method of claim 1, further comprising:
   measuring present voltages and currents at respective distributed generators;
   calculating a three-phase reference currents based on the set power outputs and low-pass filtered reference voltages; and
   regulating each current in three-phase current separately to follow the reference current.

10. A power management system, comprising:
    a power module comprising a processor configured to determine a voltage level of a grid, to set power outputs for one or more distributed generators on the grid to maximum if the voltage level is below a lower voltage threshold, and to set power outputs for the one or more distributed generators on the grid using sensitivity-based distributed reactive power compensation if the voltage level is above the lower voltage threshold and below an upper voltage threshold by minimizing a sum of power outputs across the distributed generators, wherein a total voltage generated by the one or more distributed generators maintains the voltage level of the grid between the upper and lower voltage thresholds and is the sum of a target bus voltage and a voltage deviation at the bus determined from a voltage sensitivity matrix, the voltage deviation for a bus j being calculated as:

$$\Delta V_j = \sum_l D_{lj} \Delta Q_l$$

where $D_{lj}$ is an element of the voltage sensitivity matrix defined as $$D = \left( \frac{\partial Q}{\partial V} - \frac{\partial Q}{\partial \theta} \frac{\partial P^{-1}}{\partial \theta} \frac{\partial P}{\partial V} \right)^{-1}$$

and $\Delta Q_l$ is a change in reactive power at the bus.

11. The system of claim 10, wherein the power module is configured to perform sensitivity-based distributed Q compensation by minimizing a sum of power outputs across the distributed generators.

12. The system of claim 11, wherein a total reactive power generated by one or more distributed generators maintains the voltage level of the grid between the upper and lower voltage thresholds.

13. The system of claim 12, wherein the total voltage is a sum of a target bus voltage and a voltage deviation at the bus determined from a voltage sensitivity matrix.

14. The system of claim 10, wherein the grid comprises a dynamic load.

15. The system of claim 14, wherein the dynamic load comprises one or more single phase induction motors that have stalled.

16. The system of claim 10, wherein the power module is configured to perform said functions of conditionally setting power outputs during an islanding condition in the grid.

17. The system of claim 10, wherein the power module is configured to perform said functions of conditionally setting power outputs during a recovery period subsequent to an islanding in the grid.

18. The system of claim 10, further comprising one or more controllers, each corresponding to one or more distributed generators, wherein each controller is configured to measure present voltages and currents at the respective distributed generator, to calculate a three-phase reference current based on the set power outputs and low-pass filtered reference voltages, and to regulate each current in three-phase current separately to follow the reference current.

* * * * *